Figure 1:
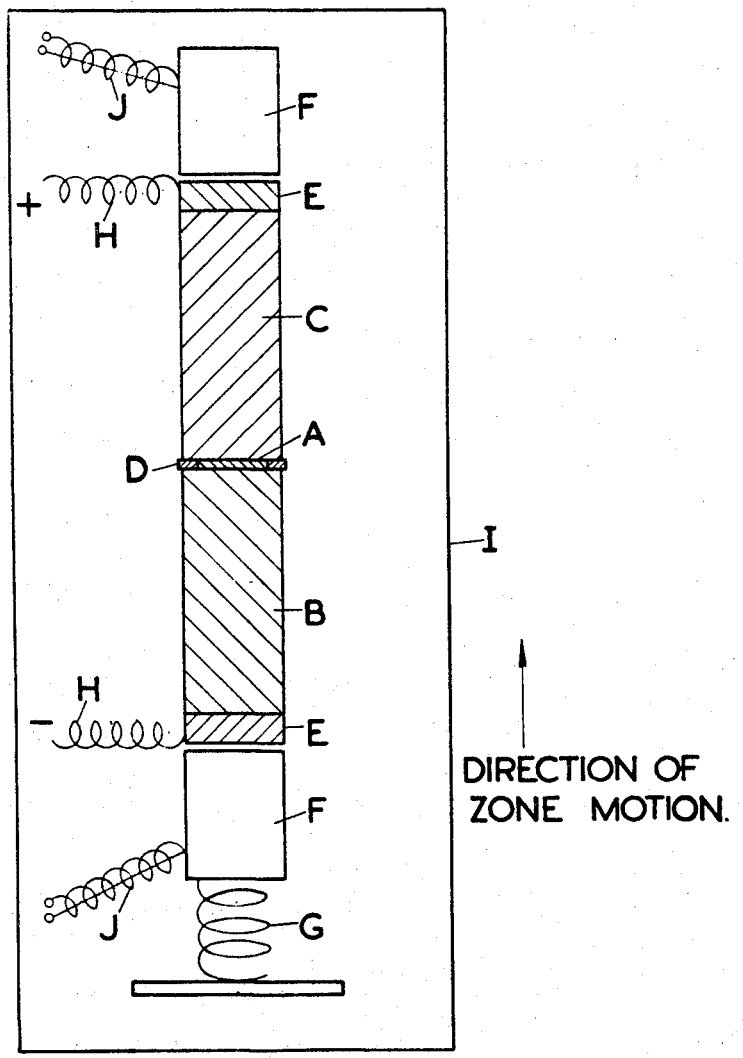

United States Patent Office
3,378,409
Patented Apr. 16, 1968

3,378,409
PRODUCTION OF CRYSTALLINE MATERIAL
Donald Thomas James Hurle and John Brian Mullin, Malvern, England, assignors to Minister of Aviation, in Her Majesty's Government of the United Kingdom of Great Britain and Northern Ireland, London, England
Filed May 14, 1964, Ser. No. 367,503
Claims priority, application Great Britain, May 14, 1963, 19,029/63
3 Claims. (Cl. 148—1.6)

This invention relates to the production of single crystal material and has reference to processes in which production is achieved by methods involving successive melting and freezing of the material.

The processes mostly used which involve melting and freezing are so called zone melting processes and so called normal freezing processes. In zone melting a solid-liquid interface is established across the length of a body of material and moved along the length, the material being successively frozen at a liquid-solid interface a short distance, say of the order 1–5 cm., behind the solid-liquid interface. In normal freezing a molten mass of material commences to freeze at one end and the action continutes by a solid-liquid interface which extends across the material moving through the liquid. In these processes trace impurities which may be present in the original material or deliberately introduced into the liquid can be redistributed in the recrystallised solid according to known laws and produce material of controlled physical and chemical properties.

However when these methods are applied to a certain class of materials a phenomenon known as constitutional supercooling can occur, and a cellular structure to the freezing solid begins to become evident which is inimical to the production of microscopically homogeneous material.

It is with this class of materials that the present invention is concerned. The class includes materials which can be crystallised from concentrated alloys (which includes so-called fluxes and so-called solutions) and also (1) elemental semiconductor materials produced from melts which are heavily doped with impurities (2) binary and n-ary compound semiconductors produced from melts which are either non-stoichiometric or contain large amounts of impurity; (3) metallic materials grown from alloy melts; (4) other materials which are or can be made electrically conductive. Typical examples of these are (1) germanium or silicon produced from melts containing say 2% or more of impurities; (2) indium antimonide grown from indium or antimony rich melts; (3) lead-tin alloys; (4) titanium dioxide.

It will be appreciated that the single elements produced from melts containing dilute concentrations of impurities, for example germanium containing very small amounts of so-called significant impurities, are not included by definition because constitutional supercooling does not occur in their case.

It has now been recognized that in this class of materials crystallization generally leads to conditions of constitutional supercooling which can cause a cellular structure to develop during freezing and that the solid-liquid interface is not planar or even smoothly curved, but appears serrated or rumpled. Consequently the microscopic uniformity of the resultant material is not as good as it would be if a planar or continuous face were maintained across the longitudinal body.

It appears desirable to maintain the solid-liquid interface as nearly possible planar or smoothly curved in the mathematical sense.

It has now been found that constitutional supercooling can be significantly reduced and the cellular structure during crystallisation from concentrated alloy melts avoided by confining the liquid to a zone or area the dimension of which in the direction of zone motion is very small (say 0.001 inch in thickness).

It has also been found that zone motion through the bulk material can be brought about by a unidirectional direct current flowing in the body of the material. Additionally the distribution of components of the liquid alloy zone and the distribution of temperature in the vicinity of the liquid alloy zone which are responsible for the occurrence of constitutional supercooling can be changed for the better by the passage of the electric current to avoid a cellular structure.

According to the present invention there is provided a process for the production of microscopically uniform single crystal material in which a concentrated liquid alloy zone traverses a body of the material in the presence of a direct electric current in the body, the current itself effects the traversal of the zone, and the dimension of the zone in the direction of traversal is very small.

We have named this process direct current induced Thin Alloy Zone Crystallisation.

Further, it will be appreciated that if the zone is not continuous in one plane but is localised in regions then the effect of the current will be to produce within the body of the original material localised portions of homogeneous material whose properties may differ from the bulk due to the crystallisation: the process additionally confers therefore the ability to produce various structures within the body of the material which might be useful in various applications for example, in mechanical, electrical, optical or other devices.

British patent specification No. 762,082 described the passing of a current of a few amperes through an ingot prior to zone refining solely for the purpose of heating the ingot so that it is raised above a tempterature of 500° C. before zone-refining begins; the effect of this prior heating current is only to facilitate the subsequent zone heating by a high-frequency induction heater; the conductivity of silicon is more favourable to induction heating at the higher temperature.

British patent specification No. 775,986 described the passing of an electric current (direct or alternating) through a semiconductor body for an unspecified purpose during a melting operation. The process dscribed in that specification is only concerned with extreme purification.

Figure 2:
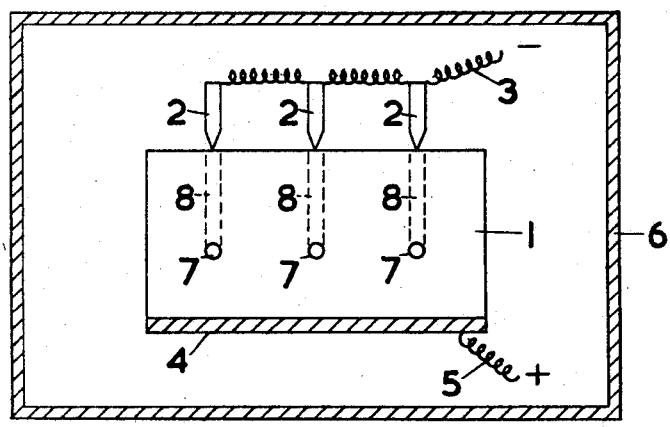

In order to make the invention clearer examples of processes embodying the invention will be described and some discussion of principles involved in processing will be given to assist the further understanding of the invention. Reference will be made to the accompanying drawings, in which:

FIGURE 1 is a partly sectioned diagram of an arrangement for the production of single crystal germanium doped with gold by direct current induced Thin Alloy Zone Crystallisation; and FIGURE 2 is a diagram of an arrangement for producing different material as a structural array within bulk material.

In FIGURE 1 a 0.001 inch thick disk A of gold or gold germanium alloy is held between two bars of germanium B and C and retained in position by a very thin mica washer D. The faces of the bars B and C adjacent to the disc A are polished planar. Electrodes E and temperature adjusting units F are attached to the remote ends of the bars B and C. Wires H connect the electrodes to a stabilised source of direct current (not shown in the diagram). Axial pressure is applied to the assembly by the spring G. The whole apparatus is contained in an envelope I which is either evacuated or filled with a protective atmosphere. The units F electrically fed through leads J are capable of supplying or removing heat from the ends of the composite bar BAC. These units are accurately controlled by electronic equipment of conventional design and, for simplicity, not shown in the figure. Alternatively a cylindrical heater enclosing the bar may be used as well as or in place of the units F.

The process is initiated by raising the temperature of the composite bar BAC, by the use of an alternating current, the units F or the cylindrical heater until a molten Au-Ge alloy zone is formed from the disc A. Subsequently the zone is moved by the application of a direct current through the wires H. Simultaneously the initial heating is reduced, or even replaced by cooling, so as to maintain the average temperature of the zone at a predetermined value dependent upon the final gold concentration required in the crystal. Care must be exercised when applying the direct current because if changes of temperature of the liquid zone occur unwanted freezing, or liquifying, can be caused; the thickness of the zone is not then maintained, to the detriment of the material produced.

The germanium B is an oriented seed crystal and when the molten zone is made to move up the bar away from B, Au doped germanium grows epitaxially from B. The direction of the electric current in this case has been found to be that indicated in the diagram. It is noted however that for other systems it may be necessary to change the polarity.

Although the example described involves the growth of a single crystal of a material of the semiconductor class from a melt which is a binary alloy it is to be understood that the invention may also be applied to other materials of the classes cited; the melt may be composed of more than two constituents. In some instances it may be necessary to replace the mica washer D by a washer of another material which is inert to the liquid alloy zone material involved.

To consider the principles involved in this process we first note that the direct current performs two functions, first it makes the zone move, and secondly, it assists in maintaining a planar or smoothly-curved freezing solid-liquid interface which is a requirement for the production of microscopically uniform material.

The movement of the zone is brought about by (1) electric field assisted preferential diffusion of the components of the liquid alloy zone and (2) by the generation and transport of heat produced by the Joule, Thomson and Peltier effects together.

In the example described movement of the thin zone under the influence of the direct current in the material is vertical but it will be understood that horizontal arrangements are also possible.

We can show by analysis that constitutional supercooling is reduced by the use of the very thin liquid zone. Briefly for a liquid zone two curves can be drawn one showing the equilibrium liquidus temperature distribution along the thickness of the zone and the other showing the actual temperature distribution. The degree of supercooling of the liquid at any point in the zone is determined by the difference between the two curves at the given point.

Consequently we choose to work in our direct current induced thin alloy zone melting proces with a zone made very thin so that the two curves are colinear and supercooling is effectively avoided. The zone of the example is about 0.001 in. thick and practical limitations mean that thicknesses of 0.001–0.002 in. are used; but the thickness may be reduced as far as is practically possible and the effectiveness of the process increases as the zone gets thinner. A practical upper limit for the zone thickness would be between 0.005–0.01 in. which contrasts clearly with the 0.25–2 in. zone thickness employed in conventional zone melting process. We have assumed here that the diffusion co-efficients of components of all liquid alloys are about the same; if it were found to be substantially different in any given instance the upper limit of zone thickness might be different. In general however the process will be carried out with the thinnest practicable zone.

There is also the further advantage that the current itself stabilises a planar (or nearly planar) interface under appropriate conditions. These conditions can be optimised by a suitable choice of the magnitude of the direct current. The magnitude of this current is chosen empirically and can be obtained from a careful analysis of the appropriate properties of the material and will naturally differ from one substance to another. In the choice the aim is that any tendency for the interface to become rumpled should be effectively suppressed.

The orientation of the seed crystal B may have a significant influence on the microscopic perfection of single crystals of certain materials. For example in the use of germanium alloy crystals it is desirable to maintain the solid-liquid interface coincidence with a plane of the {111} type.

The above example refers to the motion of planar zones. Zones of other geometrics are possible and can be used to produce desired structures in certain special cases. Such zone geometrics include (i) thin wires of liquid alloy which when moved through the solid, leave thin sheets of recrystallised material and (ii) small spheres of liquid alloy which when moved through the solid leave thin wires of recrystallised material. If the solid is a semiconductor, then by selectively adding so called electrically active impurities to the liquid alloy zone regions of differing conductivity type can be produced within the bulk of the material and hence a variety of semiconductor devices can be fabricated in the interior of a block of semiconductor material. Production of such structures by the motion of alloy zones using a thermal gradient are foreseen in U.S. Patent No. 2,813,048. The present invention involves the movement of the zones, not by an applied temperature gradient but by the passage of a direct electric current through the solid between appropriately placed electrodes. This method may in some cases be found to possess advantages over existing methods of zone motion, namely:

(1) Because, in general, the electrical resistivities of the solid material, the recrystallised material and the liquid alloy zone are all different the current density through the specimen will not be uniform and by appropriate positioning of the electrodes, delicate control of the motion of the zone can be achieved. For example, in the case of a semiconductor, the liquid alloy zone will have a much lower electrical resistivity than the solid and hence the current density in the zone will be much greater than the average current density in the specimen.

(2) Because of the current concentration noted in (1), large zone velocities can be achieved in semiconductors without excessive Joule heating of the specimen. Hence solid state diffusion of deliberately added impurities during processing is minimised thus permitting the formation of sharp electrical junctions.

(3) The process can be carried out nearly isothermally and hence thermal strains and unwanted changes in zone size avoided.

FIGURE 2 is a diagram of an arrangement for producing different material as a structural array within bulk material. In the figure, a block 1 of high resistivity semiconductor (e.g. silicon or garmanium) is shown. An array of small dots of a metal (e.g. gold) doped with an electrically active impurity (e.g. boron, gallium or arsenic), is formed on the top surface of the block 1 by some conventional process. The metal should be for all practical purposes insoluble in the solid semiconductor but soluble in the liquid semiconductor. Point electrodes 2 make contact with each dot and are connected in parallel via a wire 3 to one side of an appropriate source of direct electric current (not shown). An electrode 4 is fixed to the bottom of the specimen 1 and connected via a wire 5 to the other side of the source of direct electric current. The specimen is placed in an enclosure 6 which is either evacuated or filled with a protective atmosphere and is heated by a furnace (not shown) to a suitable temperature. This temperature is chosen to be above the lowest melting temperature of the metal and the semiconductor so that the dots form small liquid alloy zones. The direct electric current is now applied and its magnitude and polarity chosen so that the liquid alloy zones migrate down the block towards the electrode 4. FIGURE 2 shows, schematically, the process at a stage when the alloy zones have migrated to the position 7 and have left behind wires of recrystallised material 8 doped with the electrically active impurity.

This processing is terminated by switching off the current and cooling the specimen, when sufficient time has elapsed for the zone to have reached the electrode 4.

By removing the electrodes 2 and 4 and the metal dots 8 and forming a recrystallised region of opposite conductivity type on the lower face by a conventional alloying process an array of p-n junctions can be fabricated within the bulk of the material. If the doping levels of the electrically active impurities have been suitably chosen the structure will consist of an array of tunnel diodes.

In FIGURE 2 the zones are shown moving downward; it is to be understood that they may be moved in any direction in space.

Whilst the illustration refers only to the processing of semiconductor material it is to be understood that it may be applied to any of the classes of material listed above and used to produce a wide variety of structures.

We claim:

1. A process for the production of microscopically uniform single crystal material from material which is subject to constitutional supercooling including the steps of forming a thin concentrated liquid alloy zone in starting material said zone being less than 0.01 inch thick, and moving said thin concentrated liquid alloy zone by causing an electric current to flow in the material said process being carried out substantially isothermally such that temperature gradients which might aid or deter the movement of the liquid alloy zone are substantially absent.

2. A process as claimed in claim 1 and in which the zone extends across the whole of the material.

3. A process as claimed in claim 1 and in which said thin concentrated liquid alloy zone is bounded at the edges by starting material whereby a heterogeneous body containing a region of microscopically uniform single crystal material is formed.

References Cited

UNITED STATES PATENTS

| | | | |
|---|---|---|---|
| 2,813,048 | 12/1957 | Pfann | 148—1.6 |
| 2,996,456 | 8/1961 | Hergenrother | 152—62.3 |
| 2,998,334 | 8/1961 | Bakalar et al. | 148—185 |
| 3,046,100 | 7/1962 | Siemons et al. | 148—1.6 |
| 3,046,164 | 7/1962 | Domenicali | 148—1.6 |
| 3,086,857 | 4/1963 | Pfann | 148—1.6 |
| 3,205,101 | 9/1965 | Mlavsky et al. | 148—174 |

DAVID L. RECK, *Primary Examiner.*

HYLAND BIZOT, *Examiner.*

P. WEINSTEIN, N. F. MARKVA, *Assistant Examiners.*